United States Patent [19]

Ackley, deceased et al.

[11] 4,167,226

[45] * Sep. 11, 1979

[54] CAPSULE TURNING APPARATUS (RANDOM SPIN PRINTING)

[75] Inventors: Edward M. Ackley, deceased, late of Stone Harbor, N.J., by Edward M. Ackley, co-executor, Stone Harbor, N.J.; by James B. Ackley, co-executor, Cambridge, Ill.

[73] Assignee: R. W. Hartnett Company, Inc., Philadelphia, Pa.

[ * ] Notice: The portion of the term of this patent subsequent to Jan. 24, 1995, has been disclaimed.

[21] Appl. No.: 829,141

[22] Filed: Aug. 30, 1977

Related U.S. Application Data

[60] Division of Ser. No. 643,177, Dec. 22, 1975, Pat. No. 4,069,753, which is a continuation-in-part of Ser. No. 399,817, Sep. 24, 1973, Pat. No. 3,931,884.

[51] Int. Cl.[2] .............................................. B65G 47/24

[52] U.S. Cl. ....................................... 198/397; 101/40

[58] Field of Search ............... 198/380, 689, 493, 484, 198/397, 393; 101/40, 37, 35; 221/157, 171, 173

[56] References Cited

U.S. PATENT DOCUMENTS

| | | | |
|---|---|---|---|
| 2,774,102 | 12/1956 | Campbell | 198/689 X |
| 2,785,786 | 3/1957 | Bartlett | 221/157 X |
| 2,837,042 | 6/1958 | Laval, Jr. | 198/689 X |
| 2,845,165 | 7/1958 | Copping | 198/380 |
| 2,859,689 | 11/1958 | Ackley | 101/35 |
| 2,890,557 | 6/1959 | Greer et al. | 53/281 |
| 3,101,832 | 8/1963 | Wyle et al. | 198/380 |
| 3,176,825 | 4/1965 | Rudszinat et al. | 198/380 X |
| 3,670,865 | 6/1972 | Garland | 101/37 X |
| 3,756,402 | 9/1973 | Wagers, Jr. et al. | 209/73 |
| 3,871,295 | 3/1975 | Ackley | 101/426 |
| 4,069,753 | 1/1978 | Ackley | 101/40 |

*Primary Examiner*—Clifford D. Crowder
*Attorney, Agent, or Firm*—Miller & Prestia

[57] ABSTRACT

Capsule turning apparatus and method for use in a spin printing procedure in which a printing roll moves at a greater speed than the capsule, thus causing the capsule to rotate about its own axis while it is being printed. Many capsules, randomly arranged in a hopper, are picked up in a rotary conveyor which arranges them first in vertical arrangement relative to the path of movement of the conveyor, randomly with respect to whether the cap portions are at the top or bottom, and an air jet shifts all of the capsules in a sidewise direction, with the caps and body portions at random.

8 Claims, 8 Drawing Figures

CAPSULE TURNING APPARATUS (RANDOM SPIN PRINTING)

This is a division, of application Ser. No. 643,177 filed 12/22/75 now U.S. Pat. No. 4,069,753 which is in turn a continuation in part of application Ser. No. 399,817, filed 9/24/73, now U.S. Pat. No. 3,931,884.

INTRODUCTION

This invention relates to a capsule turning apparatus for changing the position of capsules which are originally disposed in a random arrangement in a container such as a hopper or the like. According to this invention, the capsules may be disposed in a non-uniform manner on a conveyor with the cap portions and body portions disposed at random but with all of the capsules having their axes disposed at approximately right angles to the path of the movement of the conveyor. In this position the capsules are arranged in position for such subsequent processing operations as spin printing when as in some applications and designs there is no need to discriminate between the directional disposition of the cap portion and the body portion, in which procedure the capsules are mounted in a rotatable position on individual carriers, and are passed in contact with a rotating printing roll which rotates at a speed which is considerably greater than the speed of movement of the capsule conveyor, thus causing each capsule to spin about its own axis during the printing process in a manner to apply special printing indicia having a large angle of wrap around the capsule.

BACKGROUND OF THE INVENTION

Marking machines of various types have been used commercially for marking indicia on a multiplicity of objects all of which have essentially the same size and shape. For example, machines have been successfully used for applying to relatively small articles such as pharmaceutical capsules, pellets, pills and the like, markings such as alphabetical letters, manufacturer's trademarks or other characterizing symbols for the purpose of ready identification. However, in most commercial procedures, particularly in the pharmaceutical industry, one of the primary objects of marking has been to prevent counterfeiting of products and of materials contained therein. In order to achieve this purpose, it has been highly desirable to apply an extremely accurate marking, having such a finely detailed character that counterfeiting is difficult or virtually impossible. In order to achieve this result, it has been considered necessary to avoid any relative movement between the article and the printing roll, and to avoid spinning of the pharmaceutical article about its axis.

DISCUSSION OF THE PRIOR ART

The Ackley Pat. No. 2,931,292 discloses an article marking machine of the type referred to above, which has been in successful commercial use for many years. Such an apparatus is particularly useful for handling objects which are symmetrical in form, such as pellets, pills or the like which are usually generally cylindrical or oval in shape.

Marking machines of the type disclosed in the Ackley patent are ideally constructed for accepting large numbers of individual objects which are randomly arranged in a hopper, moving them along a conveyor belt and printing with extreme fineness and accuracy on one or both sides of the objects while holding the objects completely stationary in carriers which are specifically designed for the purpose.

In the pharmaceutical industry a physiologically active substance, usually in powdered form, is often placed into a capsule which is composed of two portions: a body portion of predetermined diameter and a cap portion of slightly large diameter which slides telescopically over the body portion. In order to prevent the removal of a genuine pharmaceutical material from the capsule and substitution of a counterfeit material, such capsules have recently adopted a self-locking structure, such that the body portion and the cap portion are automatically locked to each other upon pushing the body portion onto the cap portion through a predetermined distance. This self-locking operation is irreversible after it has taken place; it is then virtually impossible to separate the cap portion from the body portion without destroying the capsule itself.

Accordingly, many capsules which are coming into extensive use at this time are not symmetrical in shape, because the cap portion necessarily has a larger diameter than the body portion.

In the cases of all such capsules, and in situations relating to many other pharmaceutical and other objects, it is often desirable to apply the printed indicia over a wide angle of surface curvature. For example, when the manufacturer has a long name, the name may be wrapped all the way around, or as much as 180 degrees of the circumference of the capsule or other objects, or even more. This is effectively accomplished by causing the object to spin about its axis or center as the indicia are printed on the surface of the object. When the object is supported in a manner to allow slippage for freedom of rotation sufficient printing friction can be provided to eliminate any substantial slippage between the printing means and the surface printed upon.

The Bartlett U.S. Pat. No. 2,785,786 discloses capsule feeding in which capsules are fed into circumferentially disposed pockets in a loading wheel from which they are discharged onto a conveyor chain which feeds them to a longitudinal printing apparatus. During this travel the axes of the capsule, both on the loading wheel and the conveyor, are aligned with the direction of capsule travel and the apparatus is incapable of providing for the desired circumferential spin printing of indicia.

The Whitecar U.S. Pat. No. 3,613,861 discloses a capsule orienting machine of imposing complexity in which the capsules are fed downwardly into respective individual tubes of a cylindrical arrangement of vertical tubes revolving about the cylindrical axis, and then are turned radially outward and finally are turned downwardly again in the axial direction. This complex mechanism does not dispose the capsules in appropriate position for spin printing of indicia.

OBJECTS OF THE INVENTION

It is accordingly an object of this invention to provide an automatic machine which can accept for mass production large numbers of capsules which are arranged completely at random in a container such as a feed hopper for example, and which can sort out and orient the capsules so that they are spaced apart uniformly from each other with the cap portions and the body portions being at random with some of the cap portions toward one side of the predetermined path of movement of the capsules and some of said cap portions toward the other side of such path.

It is a further object of this invention to provide an apparatus of this type which is of consummate simplicity as compared with the device of the Bartlett U.S. Pat. No. 2,785,786 and particularly with the complex apparatus of the Whitecar U.S. Pat. No. 3,613,861, both referred to above, and in addition is inimitably adapted for spin printing of capsules.

It is another object of this invention to provide an apparatus of this type which picks up the capsules from the hopper with a high degree of efficiency and reliability, which arranges them in a first transverse position with respect to the path of movement, and which then shifts them to a second transverse position with respect to the path of movement and to the first transverse position and then deposits them in a random condition on a conveyor belt, with the axes of the capsules substantially cross-wise to the direction of movement of the conveyor belt, in a condition ideally adapted for spin printing.

Other objects and advantages of this invention, including the simplicity and economy of the same, and the ease with which it may be adapted to the high speed mass production of spin printed capsules, will readily become apparent hereinafter and in the drawings.

DRAWINGS

DETAILED DESCRIPTION OF THE ILLUSTRATED EMBODIMENTS

Figure 1:
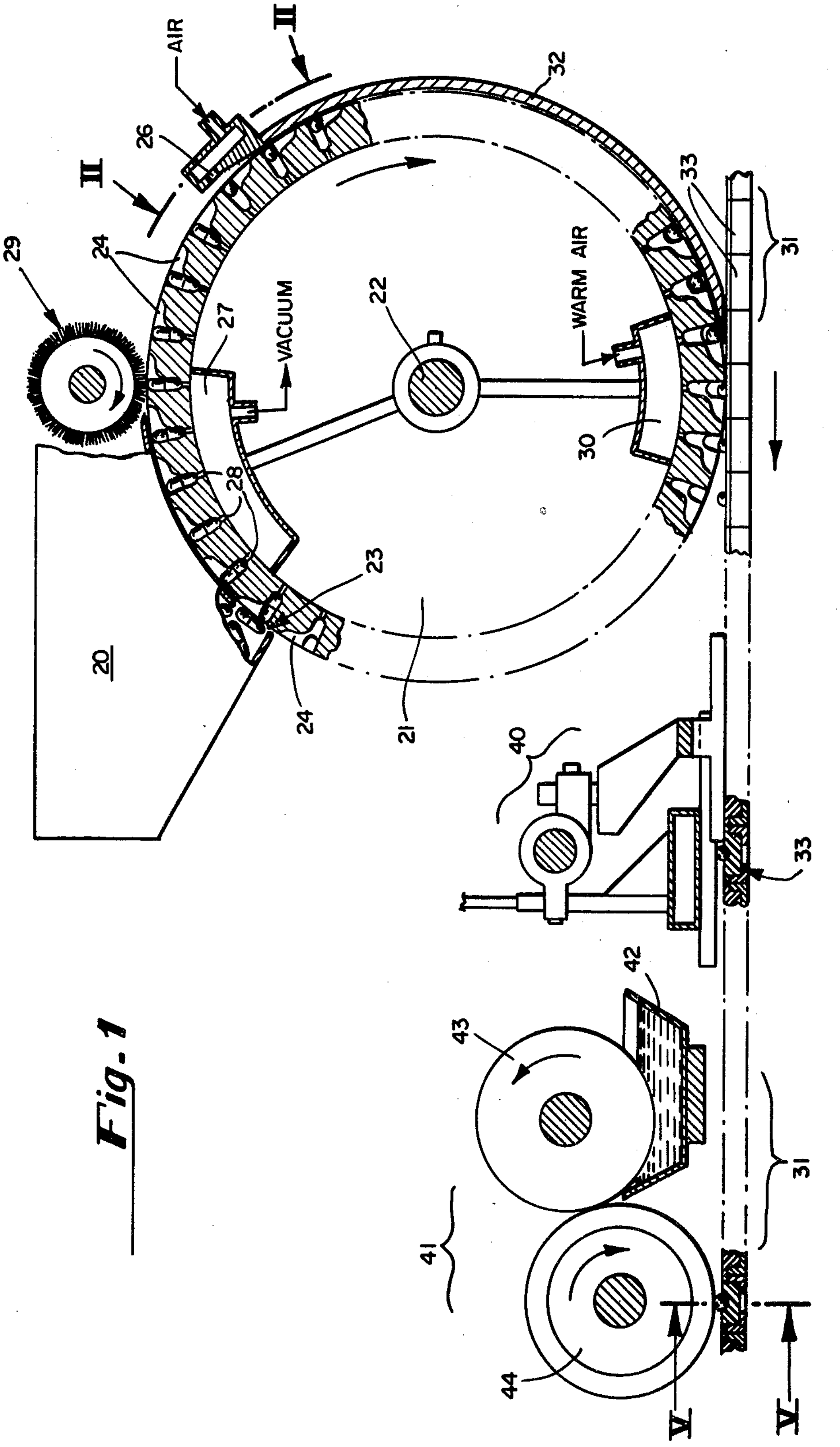
FIG. 1 is a view in side elevation, with certain parts shown in section, illustrating one embodiment in accordance with this invention.

The following description is not intended to limit the scope of the invention, as defined in the appended claims, but will be presented in specific terms in order more clearly to describe the construction and operation of the particular forms of the invention that have been selected for illustration in the drawings.

Turning to FIG. 1, the number 20 designates a capsule carrying hopper which is mounted on a suitable support (not shown) above a portion of a rotatable cylinder 21 which is mounted for rotation about an axle 22 in the direction indicated by the arrow. A motor (not shown) is provided for rotating the cylinder 21. The hopper 20 has an opening as indicated at 23 for delivery of capsules to a plurality of equally spaced, generally elongated cavities 24 which are formed in and extend across the outer surface of the rotatable cylinder 21. It will be observed that the capsule cavities have elongated portions which extend in a generally radial direction, as will be described in more specific detail hereinafter allowing the capsules to be received by the cylinder 21 in generally radial positions. As will become apparent in further detail hereinafter, some of the capsules naturally fall into the cavities 24 in an upright position, with the body portions above the cap portions, while other capsules fall naturally into the cavities 24 in an inverted position, with the cap portions above the body portions.

The number 27 designates a stationary vacuum chest which is located immediately adjacent to the inner surface of the cylinder 21 and which serves to assist in the introduction of the capsules into their cavities, the influence of the vacuum being effected through small holes 28 which extend through inner portions of the cylinder 21 into the capsule cavities 24.

The number 29 designates a rotating brush which serves to straighten out any capsules that might be lying in an angular position, as opposed to the upright radial position illustrated in FIG. 1.

The number 26 designates a group of air jets, which are directed substantially crosswise of the machine, which tend to shift all of the capsules in a crosswise or transverse direction axially with respect to the cylinder 21, as appears in FIG. 1, and as will be described in further detail hereinafter.

The number 30 designates a source of warm air located adjacent to the bottom of the cylinder 21, and serves to assist in the gravity release and transfer of the capsules from a bottom portion of the cylinder 21 onto a conveyor belt 31.

It will be apparent that the air jets 26 are mounted in stationary positions but are spaced close to the rotating cylinder 21. Similar comments apply with respect to the vacuum chest 27 and to the warm air chest 30.

A curved plate 32 is arranged in closely-spaced relation to the outer surface of the cylinder 21, extending circumferentially from just beyond the air jets 26 to near the bottom, maintaining the capsules in an axial direction with respect to the cylinder 21 and preventing the capsules from falling prematurely by gravity out of their capsule cavities 24. However, such plate 32 terminates just short of the bottom of the cylinder 21, thus liberating the capsules to move by gravity, and under the influence of warm air, onto individual capsule carriers 33 carried by the conveyor 31.

The number 40 designates an air blasting means for separating the cap and the body portion to a limited degree in order to provide an exact overall length for each capsule, preparatory to the spin printing operation. This air separator is the subject of a separate application for patent, Ser. No. 393,964, filed Sept. 4, 1973, now U.S. Pat. No. 3,868,900, and which is not itself a part of the invention claimed herein. The number 41 generically designates an offset printing apparatus which is ideally adapted for spin printing in accordance with this invention. It includes an ink reservoir 42, a transfer roll 43, and a printing roll 44 which is continuously rotated in the direction indicated by the arrow thereon, in contact with the capsules as they move underneath the roll 44, carried by their carriers 33 on the conveyor 31. In the spin printing process, one or more elongated forms of indicia are preferably printed on the outer surface of the capsule by adjusting the speed of rotation of the roll 44 so that its surface speed is considerably greater than the speed of movement of the conveyor 31. Preferably, the capsule carrier 33 is composed of a slippery material such as polytetrafluoroethylene for example, which has a co-efficient of friction which is less than that of the printing roll, thus permitting the capsule to rotate freely upon its axis under the frictional influence of the printing roll 44 during the spin printing process.

Figure 2:
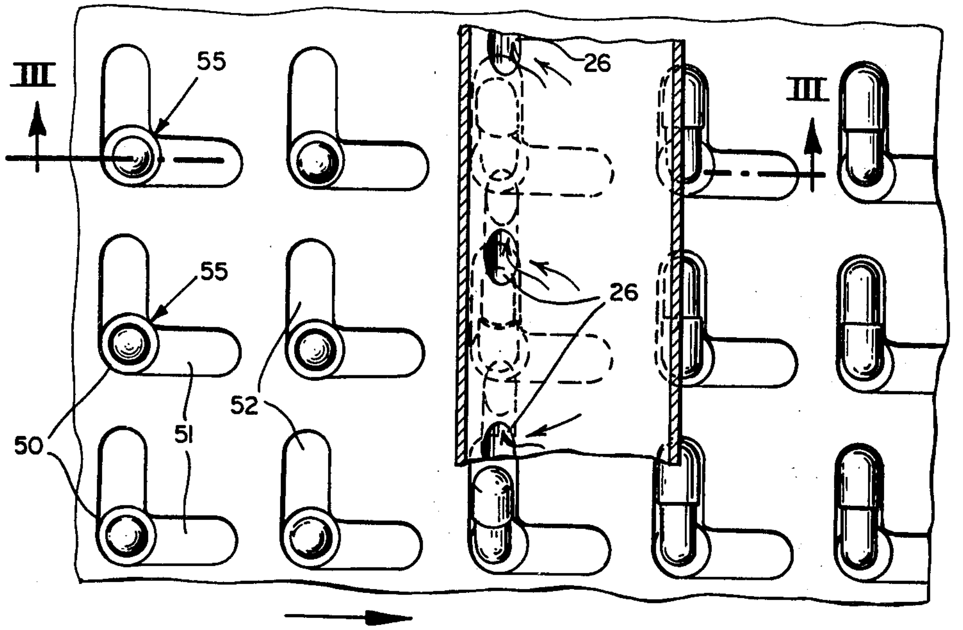
FIG. 2 is a fragmentary sectional view of a portion of the apparatus, taken as indicated by the lines and arrows II—II which appear in FIG. 1.
Figure 4:
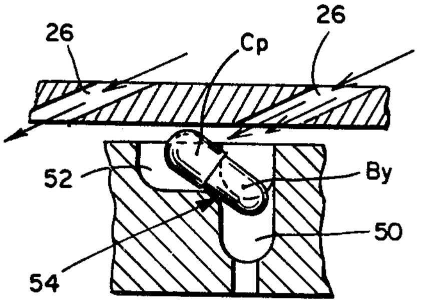
FIG. 4 is a fragmentary sectional view, taken as indicated by the lines and arrows IV—IV which appear in FIG. 3.
Figure 3:
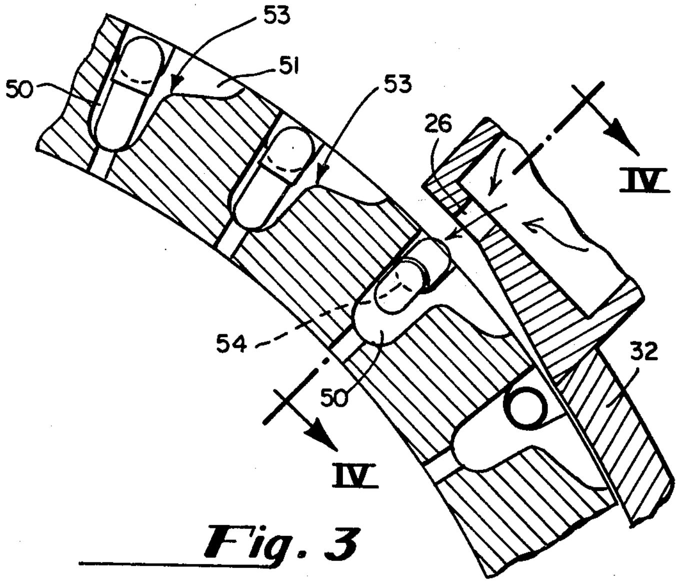
FIG. 3 is a fragmentary sectional view of a portion of the apparatus, taken as indicated by the lines and arrows III—III which appear in FIG. 2.

Referring now to FIGS. 2, 3 and 4 of the drawings, it will be apparent that each capsule cavity 24 includes a generally radially-directed pocket portion 50, a generally longitudinally-directed portion 51 and a transversely-directed portion 52 extending in a generally axial direction with respect to the cylinder 21. The pocket portion 50 is connected by walls having a surface curvature at 53 to the longitudinal portion 51, and by walls having surface curvature 54 to transverse portion 52. Another wall having a rather sharp divider portion 55 extends between longitudinal pocket portion 51 and transverse pocket portion 52. As shown in FIGS. 1 and 3, the axes of the radially-directed pocket portions 50 are disposed in an annulus or ring-like area adjacent to the circumference of the cylinder 21.

A typical capsule is shown in FIG. 4 at an angle to its upright or radial position, in which the body portion By happens to be located beneath the cap portion Cp, although this is immaterial for purposes of the present invention. It will be appreciated that the transverse air jets 26 impinge upon the cap portions Cp or the body portions By, whichever happens to be uppermost, and slide them around the curved portion 54 (see also the upper portion of FIG. 3, central portion), forcing the capsule into the crosswise or transverse position, with its axis disposed in an axial direction with respect to the cylinder 21.

Figure 5:
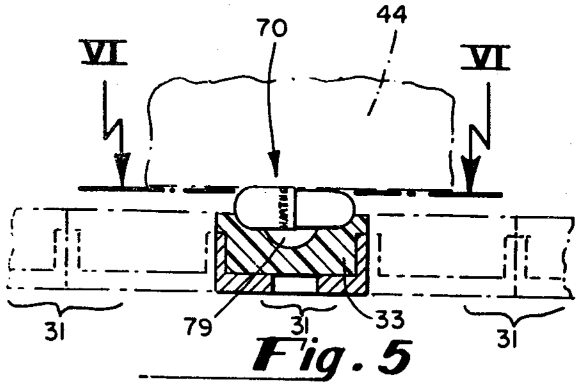
FIG. 5 is a sectional view of a portion of the spin printing apparatus appearing in FIG. 1, taken as indicated by the lines and arrows V—V which appear in FIG. 1.
Figure 6:
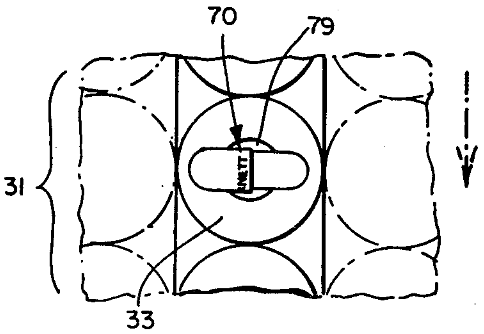
FIG. 6 is a view in plan of a portion of the capsule conveyor which is used in the spin printing operation, looking in the direction indicated by the lines and arrows VI—VI which appear in FIG. 5.

It will now be apparent that, with all of the capsules thus turned in an axial direction with respect to the cylinder 21 and disposed randomly with respect to orientation of the cap and body portions, they move downwardly around the periphery of the rotatable cylinder 21 maintained within their transverse cavity portions 52 in a side-wise position by the guard plate 32, and are deposited, under the influence of gravity and of the warm air 30, still in the transverse position onto the carriers 33. They are subsequently subjected to spin printing in a manner to apply bands 70, 70 or the like, as appears in FIGS. 5 and 6 of the drawings, the printing roll 44 being driven at a greater peripheral velocity than the velocity of movement of the conveyor 31 and recessed at 79 to avoid smearing of the printed indicia.

The capsule-engaging bottom of the printing roll 44, as indicated in FIG. 1, moves in the same direction as the conveyor 31, thus minimizing the initial slippage which occurs when the roll 44 first engages the capsule. Prior art printing apparatus in which rollable cylindrical components are moved by a carrier and presented to a rotating printing wheel, for example as in the patent to L. Gray, Jr. No. 3,424,082, has the printing surface moving in a direction opposite to the translatory movement of the component, thus causing substantial initial slippage between the printing surface and the component, tending to adversely affect printing quality. Movement of the printing surface in the same direction as the conveyor, as disclosed herein, provides a smoother and less jerky job of printing. After being turned to the transverse position by the air blast means 40, the capsules are at all times in their subsequent path of movement maintained with their axes in an axial direction with respect to the cylinder 21.

Figures 7, 8:
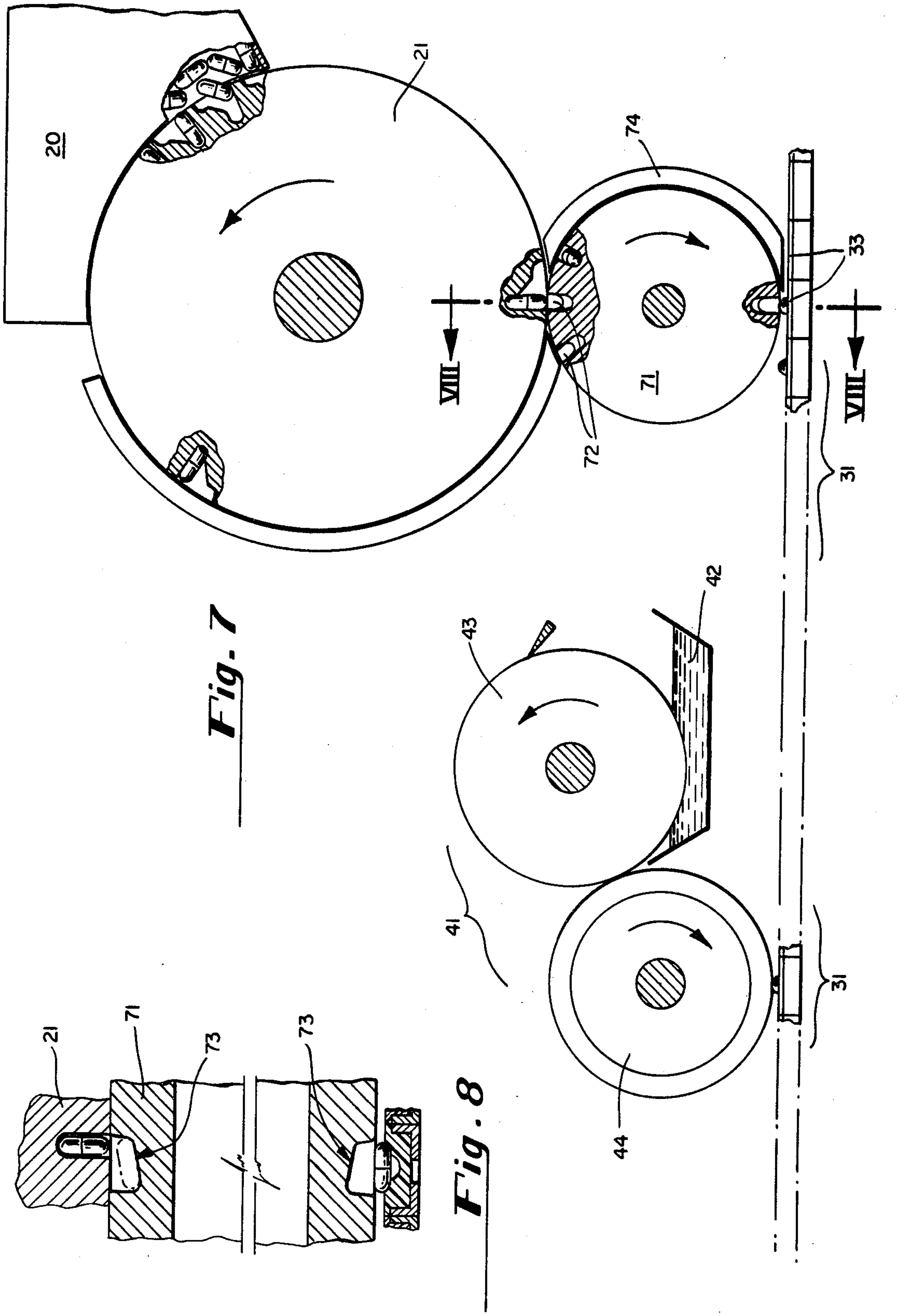
FIG. 7 is a view in side elevation, with certain portions removed and shown in section in order to reveal important details of an apparatus illustrating an alternative form of this invention.
FIG. 8 is a fragmentary sectional view of a portion of the apparatus, taken as indicated by the lines and arrows VIII—VIII which appear in FIG. 7.

An alternative form of the invention appears in FIGS. 7 and 8. Similar parts are numbered in a similar manner as in the preceding drawings and such parts numbers will not be redescribed at this point in this specification. However, in this form of the invention a rotatable transfer cylinder 71 is provided beneath the rotatable cylinder 21, this cylinder having pockets 72 provided with angularly-sloping bottom surfaces 73 as shown in FIG. 8. The speeds and pocket positions of cylinders 21, 71 are synchronized. In this embodiment of the invention, the capsules are maintained in a substantially radial position in the cylinder 21 and are dropped vertically at the bottom of the path of movement of the cylinder 21 onto the angularly-related pockets 72, thus turning the capsules toward a transverse direction with respect to the direction of the machine travel. During the rotation of the cylinder 71, the capsules are maintained in place by the curved guard plate 74 and they are then deposited on the conveyor 31 in substantially the manner heretofore described. They are again subjected to spin printing substantially in the manner heretofore described.

Although this invention has been described in conjunction with certain specific forms and certain modifications thereof, it will be appreciated that a wide variety of other modifications can be made without department from the spirit of the invention. For example, some of the features of the invention may be used independently of other features, including the use or non-use of the vacuum chest 27 or the warm air chest 30 and the use or non-use of the apparatus for partially separating the cap and the body portions prior to spin printing. Indeed, the capsule turning apparatus is capable of uses independent of spin printing, although it is admirably adapted for that use.

Additionally, in accordance with this invention, various equivalent elements may be substituted for those shown and specifically described, and in many instances parts may be reversed in ways which will become apparent to those skilled in the art, all without departing from the scope and spirit of this invention as defined in the appended claims.

I claim:

1. In a pharmaceutical capsule transporting apparatus of the type having a continuously rotatable capsule transporting cylinder having a plurality of elongated upstanding spaced apart pockets, each pocket having a radially extending portion arranged to receive and transport a capsule in an upstanding position therein, means for rotating the cylinder, a conveyor carrying a plurality of capsule carriers, and means for transferring capsules from the cylinder pockets to the capsule carriers, the improvement comprising:

(a) a hopper having an opening therein, the opening located adjacent the capsule transporting cylinder to deliver capsules to the radially extending portion of each pocket;

(b) a plurality of holes, each of which extend through inner portions of the capsule transporting cylinder into the capsule pockets;

(c) a vacuum chest located adjacent to the inner surface of the cylinder and communicating with the pockets through the holes to assist in the delivery of the capsules from the hopper into the radially extending portion of each cylinder pocket in such manner that substantially an entire capsule is received in the radial portion;

(d) a perpendicular portion in each pocket being connected to the radial portion by means of a curved surface, the perpendicular portion being generally perpendicularly disposed with respect to the radial portion; and (e) fluid jet means spaced close to the transport cylinder to shift the capsules from the radial portion of each pocket into the perpendicular portion of the pocket.

2. Improved apparatus as recited in claim 1 further including a rotatable brush positioned adjacent the cylinder and downstream from the hopper to straighten out any capsules that might be lying in an angular position.

3. Improved apparatus as recited in claim 1 wherein said vacuum chest is stationary.

4. Improved apparatus as recited in claim 1 wherein said means for transferring capsules from the cylinder pockets to the capsule carriers includes a source of warm air located adjacent the cylinder to assist in gravity release and transfer of the capsules from a bottom portion of the cylinder onto the capsule carriers.

5. Improved apparatus as recited in claim 4 wherein said pockets are arranged in a plurality of adjacent rows, each said row of pockets extending across said transporting cylinder in the axial direction thereof.

6. Improved apparatus as recited in claim 5 further comprising means for preventing premature falling of said capsules out of said pockets, said means being located adjacent said transporting cylinder and extending circumferentially from a location proximate to said fluid jet means to a location proximate the bottom of said transporting cylinder.

7. Improved apparatus as recited in claim 6 wherein said means for preventing premature falling of said capsules out of said pockets comprise a curved plate.

8. Improved apparatus as recited in claim 5 wherein a plurality of separate fluid jet means are provided, said fluid jet means being positioned in a row, said row disposed substantially crosswise of said transporting cylinder and in the axial direction of said transporting cylinder.

* * * * *